3,592,841
Patented July 13, 1971

3,592,841
KETO-CARBOXYLIC ACIDS
Ronald L. Broadhead, Addison, Ill., and Yedavalli Shamsunder Rao, Dundas, Ontario, Canada, assignors to The Richardson Company, Melrose Park, Ill.
No Drawing. Filed Dec. 1, 1967, Ser. No. 687,139
Int. Cl. C07c *101/48, 65/14, 149/90*
U.S. Cl. 260—515M                                14 Claims

ABSTRACT OF THE DISCLOSURE

Aromatic poly(keto-carboxylic) acid compositions characterized by polyphenyl moieties and useful as crosslinking agents for polyesters, as plasticizers, and as reactants in the preparation of polymeric compositions. These compositions are illustrated by 4,4'-oxybis(2-benzoyl benzoic acid).

BACKGROUND AND SUMMARY

This invention relates to a family of aromatic polybasic compositions containing acidic- and keto-carbonyl groups in particular relationships and more particularly to those acids which are characterized by the following moiety:

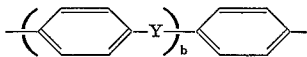

wherein $b$ is an integer of at least one and Y represents an inorganic bridge such as oxygen.

These compositions include polybasic acids and their derivative esters and acid chlorides which are characterized by the above moiety and the formula:

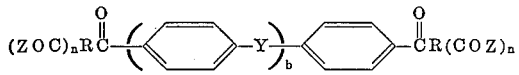

wherein $b$ is an integer of one or more, Y is a bridge of oxygen, sulfur or nitrogen, each R is a multivalent organic radical characterized by benzoid unsaturation, $n$ is an integer of 1–3, one —COZ group being in a position on each R common to an internal cyclic anhydride with respect to the keto-carbonyl group, and Z is —OH, —OR$_1$, or —Cl where R$_1$ is a lower alkyl.

These compositions are useful as cross-linking agents for polyesters, as plasticizers, and as reactants in the preparation of polymeric compositions such as polyesters and polyamides. In respect to the condensation reaction, reactivities of illustrative acids such as:

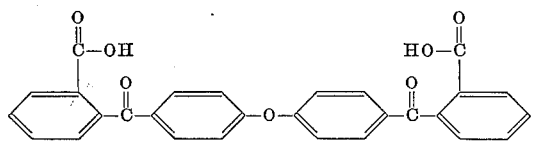

with alcohols indicate significantly faster rates than values for more conventional acidic reactants such as phthalic anhydride. It is thought that the adjacent positions of the carboxyl and keto groups in the unusual acids may contribute to their reactivity rates.

DESCRIPTION

As described above, the compositions are characterized by the integer $n$ in the above formula being a value of 1–3. When $n$ equals 3, the two additional —COZ groups are on R in nonanhydride forming positions. The resultant structures are preferred because the compositions can be prepared without the formation of polymeric products.

The preparation of these acids is advantageously carried out with anhydrides such as the following:

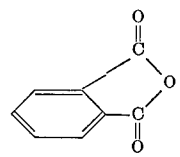

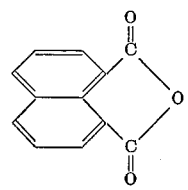

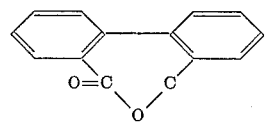

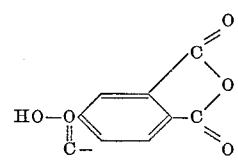

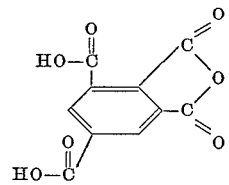

As noted above in the formulas for the anhydrides, the carbons in the internal cyclic anhydride group are not always but usually attached to adjacent carbon atoms in the aromatic ring. In the resultant keto-carboxylic acids, the carboxyl and keto-carbonyl groups are therefore attached to the aromatic ring in positions common to anhydrides. Usually, the carboxyl group is in an ortho position with respect to the keto-carbonyl group.

Therefore, the preparation of these acids utilizes anhydrides which may be described as having only one internal anhydride group and 0–2 carboxyl groups as illustrated above. The reaction also utilizes a polyaryl reactant and conditions of a Friedel-Crafts reaction. Usually and advantageously, the ester and acid chloride derivatives are produced from the corresponding acids in order to avoid the formation of polymeric products.

When acidic reactants having more than one anhydride group or acid chloride group, in addition to carboxyl groups, are utilized, polymeric acids are usually produced. These products are produced from reactants such as the 4-acid chloride of 1,2,4 benzene tricarboxylic acid anhydride, 4,4', 5,5' benzophenone tetracarboxylic acid dianhydride and the like. The polymeric acids may be represented by the formula:

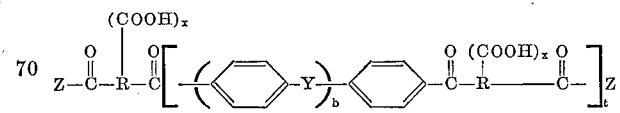

wherein $b$, Y, R, and Z are groups described previously, $x$ is an integer from 1-2 and $t$ is an integer of at least 2. Somewhat similar to the monomeric acids, these polymeric acidic compositions advantageously may have certain of the acidic- and keto-carbonyl groups attached to R in positions common to cyclic anhydride groups.

In the process for preparing acids with carboxyl and keto groups in positions common to anhydride, the acidic reactant utilized has the formula:

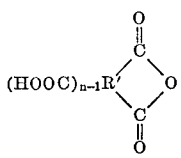

wherein the integer $n$ is equal to 1-3, advantageously 1-2 and preferably 1, because of the availability of the designated anhydrides and the functionality of the resultant keto-carboxylic acids particularly for the preparation of polyesters.

R' in the formula represents anhydrides with the same or different R groups with R being described as an organic multivalent cyclic radical characterized by benzoid unsaturation. Advantageously, R is derived from the more commonly available aromatic groups such as benzene, naphthalene, diphenyl, benzophenone, anthracene, and the like, and preferably a mononuclear aromatic such as benzene. R may be unsubstituted or substituted with groups which do not interfere with the acidic functionality or reactivity of the initial anhydrides used in the reaction or the resultant products. Suitable substituents include halogens such as chlorine, hydrocarbons such as the lower alkyls, and groups such as oxygen in an ether form.

The second reactant has the formula:

wherein Y represents an inorganic bridge containing oxygen, sulfur and nitrogen or substituted groups thereof. Usually, Y is —O—, —S—,

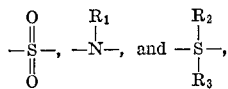

with $R_1$, $R_2$ and $R_3$ being alkyl and/or aryl. Advantageously, Y is based on oxygen or sulfur and the above combinations thereof, and preferably oxygen. The phenyl groups in the reactant may be unsubstituted or substituted, with suitable substituents being previously defined with respect to R. Advantageously, the substituent is a halogen and preferably chlorine.

Advantageously, $b$ in the formula for the polyaryl reactant is an integer of 1-3 and preferably 1, although $b$ in general can be such to represent polyaryl reactants having several phenyl groups.

The reactants are present in a respective mole ratio of at least two moles to one mole and the reaction is carried out under conditions of a Friedel-Crafts reaction with at least about 4 moles and up to about 8 moles of $AlCl_3$ based on a difunctional acidic reactant. With higher functional acidic reactants such as trimellitic anhydride, the $AlCl_3$ is adjusted accordingly. In addition, the reaction conditions include the use of a solvent mixture of a chlorinated lower alkane such as methylene dichloride, tetrachloroethane, and the like; and a nitrated aromatic such as nitrobenzene, nitrotoluene, and the like. The use of the solvent mixture provides a system whereby a disubstitution of the defined second reactant occurs.

The process produced keto-acids in yields above about 50% and in many instances above about 75%. Advantageously, the process is carried out with an aromatic anhydride wherein $n$ equals 1 and with diphenyl oxide. In a typical example, phthalic anhydride and diphenyl oxide are reacted in a mole ratio of about 2:1 and in a solvent mixture (4:1 by volume) of tetrachloroethane and nitrobenzene. Approximately 5 moles of anhydrous aluminum chloride are utilized. After the reaction is essentially complete, the mixture of reactants is decomposed with dilute hydrochloric acid and the solvent mixture is removed by steam distillation. The polybasic acid, 4,4'-oxybis (2-benzoyl-benzoic-acid), is further purified by dissolving it in sodium hydroxide followed by reprecipitation in dilute acetic acid and dilute hydrochloric acid. The acid is characterized by a melting point of 265° C. and is obtained in yields of about 87–90%.

Illustrative polybasic acids include:

4,4'-oxybis (2-benzoyl benzoic acid),
4,4'-oxybis (2-tetrachlorobenzoyl benzoic acid),
4,4'-oxybis (2-tetrabromobenzoyl benzoic acid),
4,4'-oxybis (2-benzoyl-2'-carboxyl benzoic acid),
4,4'-oxybis (2-tetrachlorobenzoyl-3'-carboxyl benzoic acid),
4,4'-oxybis (2-benzoyl tetrachlorobenzoic acid),
4,4'-oxybis (2-benzoyl tetrabromobenzoic acid),
4,4'-oxybis (2-benzoyl naphthoic acid),
4,4'-thiabis (2-benzoyl benzoic acid),
4,4''-thiabis (2-tetrachlorobenzoyl benzoic acid),
4,4'-thiabis (2-benzoyl tetrachlorobenzoic acid),
4,4'-thiabis (2-benzoyl naphthoic acid),
4,4'-sulfonyl bis (2-benzoyl benzoic acid),
4,4'-sulfonyl bis (2-benzoyl-2'-carboxyl benzoic acid),
4,4'-methylamino bis (2-benzoyl benzoic acid),
4,4'-methylamino bis (2-benzoyl naphthoic acid), and similar acids derived from polyphenyl reactants wherein the defined $b$ is 2–3. Advantageously, the above compositions are mononuclear aromatic in character and preferably based on benzoyl benzoic acid.

The following examples illustrate some of the embodiments of this invention. It is to be understood that these are for illustrative purposes only and do not purport to be wholly definitive to conditions or scope.

EXAMPLE I

A reaction was carried out with phthalic anhydride and diphenyl oxide. Initially, a solvent mixture of about 80 ml. of tetrachloroethane and about 20 ml. of nitrobenzene was prepared in a 500 ml. flask. About 31 g. of phthalic anhydride (0.2 mole) and about 17 g. of diphenyl oxide (0.1 mole) were then added, followed by 66.6 g. of anhydrous $AlCl_3$ (0.5 mole), with care being taken to keep the reaction temperature below 50° C. After the addition of $AlCl_3$ and evolution of hydrogen chloride gas was complete, the reaction mixture was set aside for 2 hours. It was then decomposed with about 250 ml. of ice cold dilute hydrochloric acid (15%). When the decomposition was completed, the solvent mixture was removed by steam distillation. The remaining oily material was repeatedly extracted with 5% NaOH solution. The combined alkaline extracts were acidified with dilute acetic acid, followed by dilute hydrochloric acid until precipitation occurred. The white precipitate was filtered, washed free of mineral acid and dried. The resulting 4,4'-oxybis (2-benzoyl benzoic acid) exhibited a melting point of 265° and was obtained in about a 90% yield (43 g.). It was further analyzed and was found to have a carbon content of 69.9% (calculated 72.1%), a hydrogen content of 3.90% (calculated 3.89%), and the molecular weight from the neutralization equivalent was 482.2 (calculated 466 for $C_{28}H_{18}O_7$ dibasic acid).

EXAMPLES II–IV

Other polycarboxylic acids were prepared from tetrachlorophthalic anhydride, tetrabromophthalic anhydride and trimellitic anhydride with diphenyl oxide in a similar manner to the preparation of the product of Example I. The products were analyzed for melting points and also for molecular weight (based on neutralization equivalent). The data appears in Table I below.

TABLE I

| Product | M.P., °C. | Molecular weight Found | Molecular weight Calculated |
|---|---|---|---|
| 4,4'-oxybis (2-benzoyl tetrachlorobenzoic acid) | 265 | 750 | 750 |
| 4,4'-oxybis (2-benzoyl tetrabromobenzoic acid) | >300 | | |
| 4,4'-oxybis (2-benzoyl-carboxybenzoic acid) | 235 | 532 | 556 |

EXAMPLES V–VI

Diphenyl sulfide was substituted for diphenyl oxide in the reactions with phthalic anhydride and tetrachlorophthalic anhydride. The resultant products were analyzed with the data appearing in Table II below.

TABLE II

| Product | M.P., °C. | Molecular weight Found | Molecular weight Calculated |
|---|---|---|---|
| 4,4'-thiabis (2-benzoyl benzoic acid) | 259 | 481 | 482 |
| 4,4'-thiabis (2-benzoyl tetrachlorobenzoic acid) | 165 | 746 | 766 |

EXAMPLE VII

The product of Example V was oxidized to convert the sulfide to a sulfonyl group, and the new product was analyzed. The product, 4,4'-sulfonyl bis (2-benzoyl benzoic acid), exhibited a melting point of 90° C. and a molecular weight of 510 (determined by neutralization equivalent). The calculated molecular weight for the acid is 514.

While the invention has been described in conjunction with specific examples thereof, these are illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

We claim:
1. A composition of the formula:

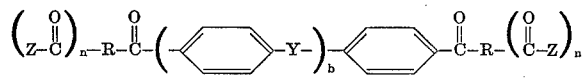

wherein Y is oxygen, sulfur or sulfonyl, R is a halogen substituted or unsubstituted aromatic ring radical selected from the group consisting of phenylene and naphthylene, Z is a member selected from the group consisting of OH, $OR_1$ and Cl, $b$ is an integer of 1 and $n$ is an integer of 1 to 3 provided that one

group on the ring R is in a ring position adjacent to the keto-carboxyl group

and that when $n$ is 3, the remaining two

groups are not on adjacent ring position of R where they may form an anhydride thereof.
2. The composition of claim 1 wherein $n$ is 1.
3. The composition of claim 1 wherein Y is oxygen.
4. The composition of claim 1 wherein Y is sulfur.
5. The composition of claim 1 wherein Y is sulfonyl.
6. The composition of claim 1 wherein Y is oxygen and R is phenylene.
7. The composition of claim 6 wherein $n$ is 1.
8. The composition of claim 1 wherein it is 4,4'-oxybis (2-benzoyl benzoic acid).
9. The composition of claim 1 wherein it is 4,4'-oxybis (2-benzoyl-tetrachlorobenzoic acid).
10. The composition of claim 1 wherein it is 4,4'-oxybis (2-benzoyl-tetrabromobenzoic acid).
11. The composition of claim 1 wherein it is 4,4'-oxybis (2-benzoyl-carboxybenzoic acid).
12. The composition of claim 1 wherein it is 4,4'-thiobis (2-benzoyl-benzoic acid).
13. The composition of claim 1 wherein it is 4,4'-thiobis (2-benzoyl-tetrachlorobenzoic acid).
14. The composition of claim 1 wherein it is 4,4'-sulfonylbis (2-benzoyl-benzoic acid).

References Cited

UNITED STATES PATENTS 2,588,802   3/1952   Burtner _____ 260—520

LEWIS GOTTS, Primary Examiner

E. J. GLEIMAN, Assistant Examiner

U.S. Cl. X.R.

260—31.2R, 31.2N, 31.8C, 31.8K, 31.8Z, 32.2, 470, 471R, 473G, 516, 518R, 520, 544M, 515A